Aug. 18, 1936.  J. WEINMANN  2,051,627
CASTER
Filed July 27, 1934
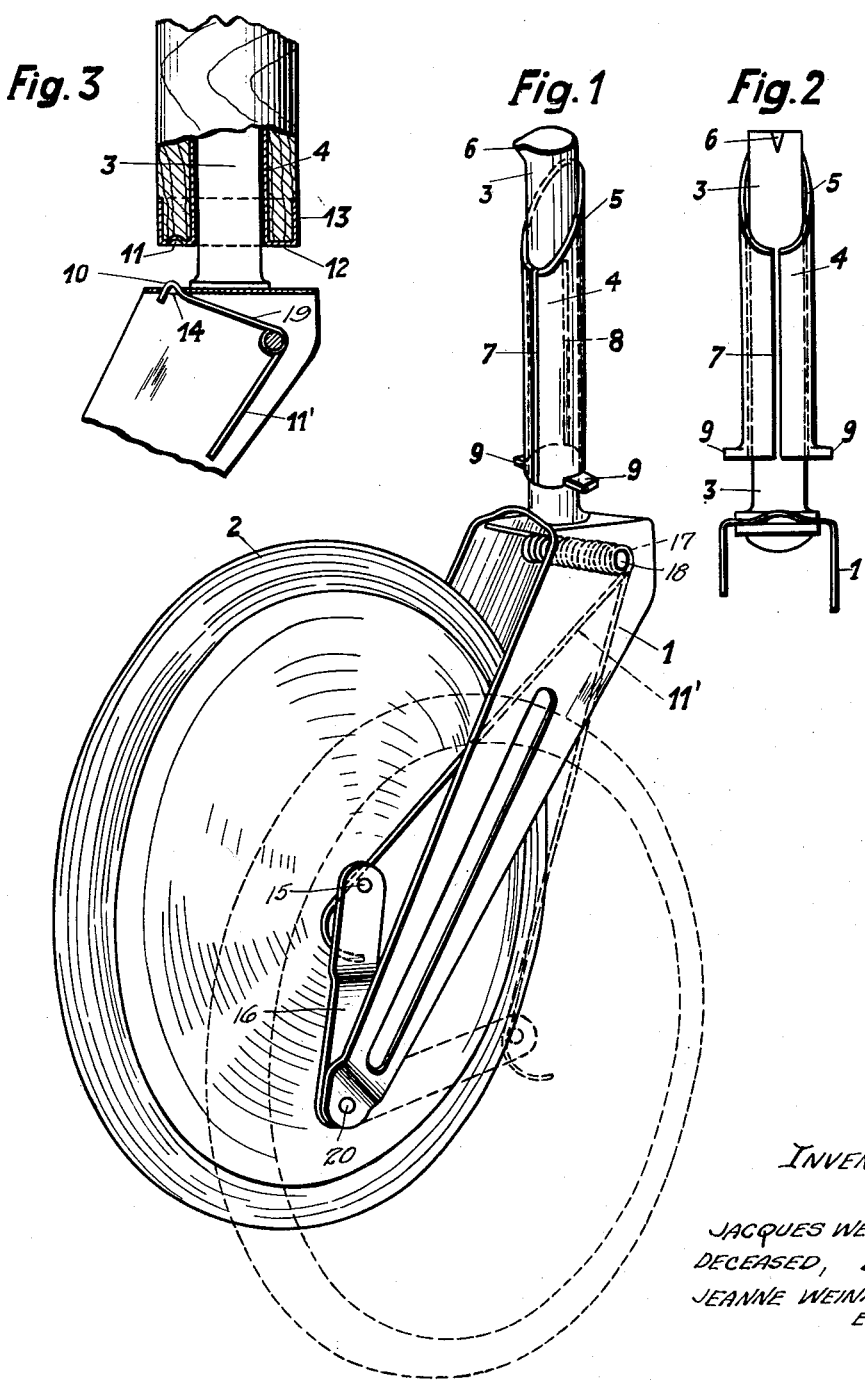
INVENTOR:
JACQUES WEINMANN,
DECEASED, BY
JEANNE WEINMANN,
EXECUTRIX.
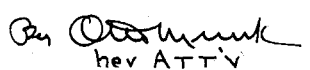
hev ATT'Y Patented Aug. 18, 1936

2,051,627

UNITED STATES PATENT OFFICE 2,051,627

CASTER

Jacques Weinmann, deceased, late of Zurich, Switzerland, by Jeanne Weinmann, executrix, Zurich, Switzerland Application July 27, 1934, Serial No. 737,259. In Germany and Switzerland February 8, 1932

3 Claims. (Cl. 16—18)

This invention relates to casters for tables and the like.

The present invention is designed to provide a caster the wheel of which can be automatically made always to assume the same position with respect to the article to which the caster is fitted so that when a number of such casters are on the article the wheels can assume positions different from one another. Owing to this the article resists all but vigorous attempts initially to displace it.

When casters constructed in accordance with the invention are applied to the legs of a table or the like, then owing to the floating of the caster wheels, accidental displacement of the table can be prevented by arranging the wheels so that they be automatically set in different planes or in different relative directions, and therefore, initially help the table to resist displacement.

According to the present invention the caster is so constructed and arranged that when the article to which it is applied is lifted a part of the caster falls relatively to the article and the relative falling movement is utilized to cause the wheel of the caster to assume a certain fixed position with respect to the said article.

In a preferred form of the invention a sleeve or socket which freely receives the pintle of the caster and is adapted to enter a bore in the leg of the article is bevelled at its upper end and the corresponding end of the pintle is provided with a projection arranged, when the article is lifted, to drop relatively to the sleeve so that the bevelled part thereof engages it and causes it and, therefore, the pintle and caster horn and wheel to turn on the axis of the said pintle.

The invention will now be described with reference to the accompanying drawing in which:—

Fig. 1 is a perspective view of a caster constructed in accordance with the present invention and Fig. 2 is a front elevation showing, more particularly the pintle and socket of the said caster, and Fig. 3 shows a device for preventing the caster wheel from turning too easily from a present position with respect to the article to which the caster is fitted.

The caster shown comprises a horn or fork 1 carrying a wheel 2 and provided with a vertical pintel 3 passing through the bore of a sleeve 4.

The sleeve is bevelled at 5 and the upper end of the pintle is provided with a nose or projection 6; and the sleeve receives the pintle in a manner permitting same easily to turn and slide with respect to the sleeve. Hence when the leg of the table or the like containing a bore which receives the sleeve and pintle is lifted the pintle drops relatively to the sleeve and the projection rides down the bevel until it reaches the lowest point thereof. This causes the pintle, fork and wheel to turn on the axis of the leg and always assume the same position with respect thereto.

When the legs of a table or the like are provided with casters as above described the casters are arranged to set in relatively different positions after the legs have been raised in the manner described, with the result that the wheels tend to move in different directions when an attempt is made to displace the article and thus prevent the displacement being performed too easily e. g. accidentally.

The sleeve 4 is of sheet metal and is split from bottom to top at 7 and partially at 8 to make it expansible so that it effectively engages the bore into which it is inserted. Radially projecting lugs 9 at its lower end provide additional securing means.

For the purpose of locking the caster in the predetermined position into which it falls the yoke of the fork 1 (Fig. 3) is provided with an upwardly projecting spring 10 adapted to enter a recess 11 in a ring 12 which connects a ferrule 13 with the sleeve 4. The recess is so arranged that the spring 10 comes exactly underneath the said recess when the leg is raised and when the leg is lowered it will enter the recess. The spring 10 and, therefore, the caster fork and wheel are locked in this position. In Fig. 3 the projection 10 is provided by upwardly bending one end of the spring 11', and passing this end through a hole 14 in the yoke of the fork.

Spring 17 is constructed as a torsion spring which is rotatable on a pin 18 disposed between the shanks of fork 1. One of the free ends 10 of spring arm 19 projects through the aperture 14 into the indenture 11 of casing 12. The other arm 11' is carried by pin 15 upon which the running wheel 2 is rotatably mounted. The journal pin 15 is attached to two link guides 16 disposed at opposite sides of the wheel 2, whereby each of them is joined to the lower end of one of the shanks of the fork 1 by means of pin 20. In the rest position of the carriage the guides 16 take a vertical or substantially vertical position. The arm 11' of spring 17 is pressed upwardly. As a consequence the free end 10 of the spring arm 19 is pressed into the recess 11. In this way the fork 1 is secured in its position in respect to parts 4, 12 and 13.

If the wheel 2, while passing over an impediment is drawn forwardly in the position shown in dotted lines in Fig. 1, the spring 17 is relieved. The wheel, i. e., the fork 1 and the pin 3 may adjust themselves freely within the casing 4. Thus a superior absorption of the shock is effected which is otherwise experienced when a table or the like comes down after passing over an impediment. As soon as the carriage is depressed after passing over an impediment, the wheels 2 are again automatically locked.

What is claimed is:—

1. In a caster, the combination of a yoke for the caster wheel, a pintle projecting therefrom and having a projection near its upper end, a sleeve surrounding the central portion of said pintle and spaced therefrom a distance less than the length of said projection, the upper end of said sleeve being bevelled downwardly, and locking means comprising a spring mounted on said yoke and adapted to cooperate with the article in which said sleeve and pintle are mounted for locking said yoke against rotation with respect to said sleeve and article when the pintle is in its uppermost position.

2. A caster, as claimed in claim 1, in which said fork is inclined and the caster wheel is provided with a journal pin, and in which the said spring is a coiled member having one arm engaged with the fork and the other with the said journal pin, and including links pivotally mounted on said fork and journalled on the journal pin, whereby when the links are in upright position, the said arm of the spring engaging the fork will automatically engage in the recess thereof.

3. In combination, a caster wheel journalled on links pivotally mounted on a fork, a pintle extending from said fork and having a projection formed at its outer end, a sleeve loosely mounted on said pintle and retained thereon against displacement by said projection, said sleeve having its upper edge formed with a cam surface to cooperate with said projection, a spring member mounted on said fork, having an arm thereof adapted to engage in a recess formed in the fork and in the article in which it is mounted and another arm to engage the wheel journal whereby said fork will be locked against rotation when it is in its uppermost position with respect to the sleeve and the article in which it is mounted.

JEANNE WEINMANN,
*Executrix of the Estate of Jacques Weinmann, Deceased.*